United States Patent [19]
Kumar et al.

[11] Patent Number: 5,737,750
[45] Date of Patent: Apr. 7, 1998

[54] PARTITIONED SINGLE ARRAY CACHE MEMORY HAVING FIRST AND SECOND STORAGE REGIONS FOR STORING NON-BRANCH AND BRANCH INSTRUCTIONS

[75] Inventors: Rajendra Kumar, Sunnyvale; Paul Gene Emerson, San Jose, both of Calif.

[73] Assignee: Hewlett-Packard Company, Palo Alto, Calif.

[21] Appl. No.: 762,539

[22] Filed: Dec. 9, 1996

Related U.S. Application Data

[63] Continuation of Ser. No. 298,861, Aug. 31, 1994, abandoned.

[51] Int. Cl.$^6$ ........................................................ G06F 12/08
[52] U.S. Cl. ............................ 711/129; 711/125; 711/173
[58] Field of Search ................................ 395/452, 456, 395/464, 480, 484, 405, 497.02, 497.03, 497.04; 711/125, 126, 129, 173

[56] References Cited

U.S. PATENT DOCUMENTS

| | | | |
|---|---|---|---|
| 4,583,162 | 4/1986 | Prill | 395/421.03 |
| 4,905,141 | 2/1990 | Brenza | 395/456 |
| 4,945,512 | 7/1990 | DeKarske et al. | 365/49 |
| 5,101,344 | 3/1992 | Bonet et al. | 395/581 |
| 5,230,068 | 7/1993 | Van Dyke et al. | 395/464 |
| 5,293,609 | 3/1994 | Shih et al. | 395/464 |
| 5,357,623 | 10/1994 | Megory-Cohen | 395/456 |
| 5,381,528 | 1/1995 | Brunelle | 395/250 |
| 5,434,992 | 7/1995 | Mattson | 395/446 |
| 5,537,571 | 7/1996 | Deville | 395/456 |
| 5,594,884 | 1/1997 | Matoba et al. | 395/452 |
| 5,619,699 | 4/1997 | Katsuta | 395/405 |

OTHER PUBLICATIONS

Hwu et al., "Comparing Software and Hardware Schemes for Reducing the Cost of Branches", 16th. Annual International Symposium on Computer Architecture, pp. 224–231, 1989.

David R. Ditzel & Hubert R. McLellan, "Branch Folding in the CRISP Microprocessor Reducing Branch Delay to Zero", AT&T, pp. 2–9, (ACM 0084–7495).

B. Ramakrishna Rau "Levels of Representation of Programs and the Architecture of Universal Host Machines", University of Illinois, Report R–819, Aug. 1978, pp. 1–44.

*Primary Examiner*—Eddie P. Chan
*Assistant Examiner*—Hiep T. Nguyen

[57] ABSTRACT

A cache memory which is partitioned during write operations into several regions in a programmable or adaptive manner is disclosed. Each region is used to store a different type of data. The partitioning of the cache memory has no effect during read operations. The partitioning can be achieved dynamically for improved optimization. The partitioned cache is particularly suited for an instruction cache wherein one of the regions stores sequential instructions and another region stores branch target instructions. However, the partitioned cache is also useful for a data cache.

3 Claims, 4 Drawing Sheets

PARTITIONED SINGLE ARRAY CACHE MEMORY HAVING FIRST AND SECOND STORAGE REGIONS FOR STORING NON-BRANCH AND BRANCH INSTRUCTIONS

CROSS REFERENCE TO RELATED APPLICATION

This is a continuation of application Ser. No. 08/298,861 filed on Aug. 31, 1994, now abandoned.

BACKGROUND OF THE INVENTION

1. Field of the Invention

The present invention relates to an instruction cache and, more particularly, to a instruction cache which is a logically partitioned horizontally into two or more sections.

2. Description of the Related Art

Most microprocessors have on-chip instruction caches to facilitate faster access to data held in memory. Typically, these caches are relatively small in size due to their area requirement and also due to cycle time constraints. Consequently, it is important that these caches be used efficiently and effectively; otherwise, performance of the microprocessor suffers.

Besides a processing system, a modern microprocessor typically has a data cache and an instruction cache. The data cache stores data which is likely to be imminently needed by the processing system (e.g., functional units or central processing unit). The instruction cache stores instructions which have been prefetched prior to their probable execution. Instruction caches are used to store two different types of instructions, namely sequential instructions and branch target instructions. Sequential instructions make up the bulk of the instructions in most programming. Branch target instructions also occur in most programming due, for example, to the presence of loops within programs.

Known techniques for implementing instruction caches have normally used two separate and distinct caches, one instruction cache storing the sequential instructions, and another instruction cache storing the branch target instructions. This conventional approach, however, is expensive to implement because additional die area as well as buses between the two caches are required. Further, this approach may also introduce extra delays. Another known approach places both sequential and branch target instructions into the same instruction cache. This conventional approach has a serious pollution problem in that one kind of instruction can displace the other type, thereby potentially inducing significant delays.

Therefore, an instruction cache which is able to store both types of instructions in a flexible and efficient manner is needed.

SUMMARY OF THE INVENTION

Broadly speaking, the invention relates to a cache memory which is partitioned during write operations into several regions in a programmable or adaptive manner. The partitioning of the cache memory has no effect during read operations. Each region in the cache memory stores a different type of data. As an instruction cache, one of the regions would store sequential instructions and another would store branch target instructions. As a data cache, one of the regions would function as a data cache memory and another region would function as a victim cache and/or a prefetch buffer. The invention can be embodied as an apparatus or a method.

As an apparatus, the cache memory includes a single array of memory cells for storing data and partition circuitry. The array of memory cells includes at least write word lines, write bit lines and read bit lines. The partition circuitry operates to partition the array into a first storage region and a second storage region. During a write operation to the array, the first and second storage regions operate as separate cache memories, yet during a read operation, they operate as a single cache memory without regard to the first and second storage regions. It is also possible to dynamically partition the array.

As a method, the invention operates a cache memory to store at least a first type of data and a second type of data. The cache memory is partitioned into at least first and second storage regions. Thereafter, when data to be written to the cache memory is received, the method determines which of the storage regions of the cache memory to store the data in. If the data received is of the first type of data, the data is stored to the first storage region. On the other hand, if the data received is of the second type of data, the data is stored to the second storage region. The partitioning, for example, can be performed statically at power-on or dynamically by program instructions contained in a computer program being executed by a processing system including the cache memory.

Other aspects and advantages of the invention will become apparent from the following detailed description, taken in conjunction with the accompanying drawings, illustrating by way of example the principals of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–4. However, those skilled in the art will readily appreciate that the detailed description given herein with respect to these figures is for explanatory purposes as the invention extends beyond these limited embodiments.

Figure 1:
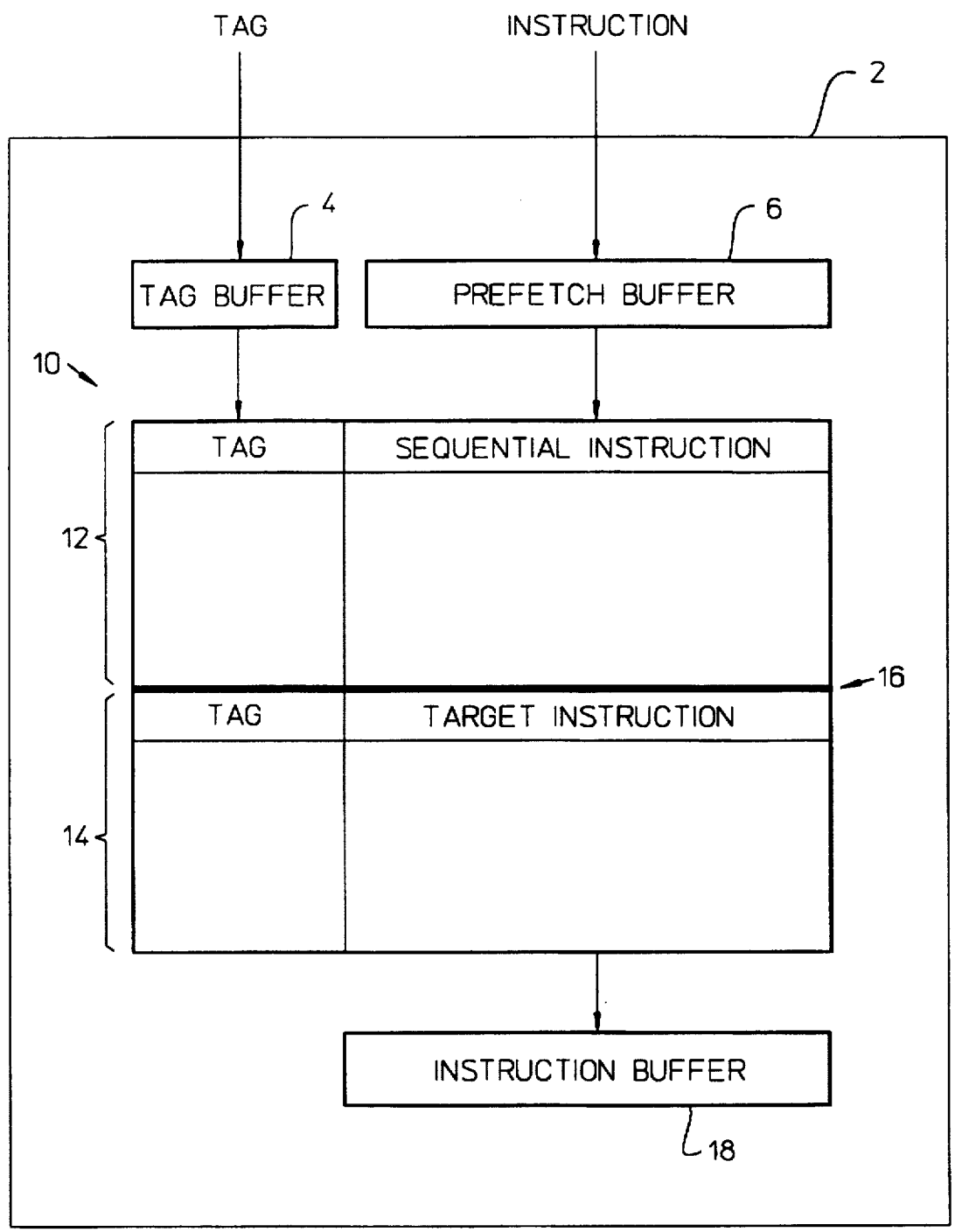
FIG. 1 is a block diagram of an instruction unit in accordance with a first embodiment of the invention.

FIG. 1 is a block diagram of an instruction unit 2 in accordance with a first embodiment of the invention. The overall object of the instruction unit 2 (during a write operation) is to receive an instruction together with its associated tag (address tag) and to store the instruction and tag in an instruction cache. Typically, with high performance computers, the instruction and tag would be obtained from main memory or a level 2 cache memory in a prefetched manner. The instruction unit 2 thereafter (during a read operation) supplies the appropriate instructions to one or more functional units of a processing system. The functional units then carry-out the instructions by performing various operations.

The instruction unit 2 includes a tag buffer 4 and a prefetch buffer 6. The prefetch buffer 6 receives instructions from an instruction stream within a program being (or about to be) executed and stores the instructions in the prefetch buffer 6. The instructions may or may not be decoded depending on the design of the processing system. The tag buffer 4 stores tags corresponding to the instructions stored in the prefetch buffer 6. As noted above, the instruction and tag received by the instruction unit 2 may come from a lower level (e.g., level 2) cache memory or main memory.

The instruction unit 2 also includes a cache memory 10. The cache memory 10 is a single cache memory, that is, contains a single memory storage array. The cache memory 10 is partitioned horizontally into a first storage region 12 and a second storage region 14. During a write operation to the cache memory 10, a sequential instruction and its associated tag would be stored to the first storage region 12 via the prefetch buffer 6 and the tag buffer 4, respectively. Alternatively, if the instruction to be written to the cache memory 10 is a branch target instruction, then the instruction and its associated tag from the prefetch buffer 6 and the tag buffer 4, respectfully, would be stored to the second storage region 14 of the cache memory 10.

The partitioning of the cache memory 10 is achieved by effectively placing a divider within the instruction cache 10 to denote a division line 16 of the partitioning. However, as will be explained further below, the division line 16 is not physically present but achieved through addressing schemes.

During a read operation, an instruction is read from either the first storage region 12 or the second storage region 14 without regard to the partitioning at the division line 16. That is, whichever instruction within the cache memory 10 has a tag which matches the tag associated with the instruction to be read is supplied to an instruction buffer 18. Thereafter, the instruction buffer 18 supplies the instruction to the appropriate functional unit of the processing system.

Figure 2:
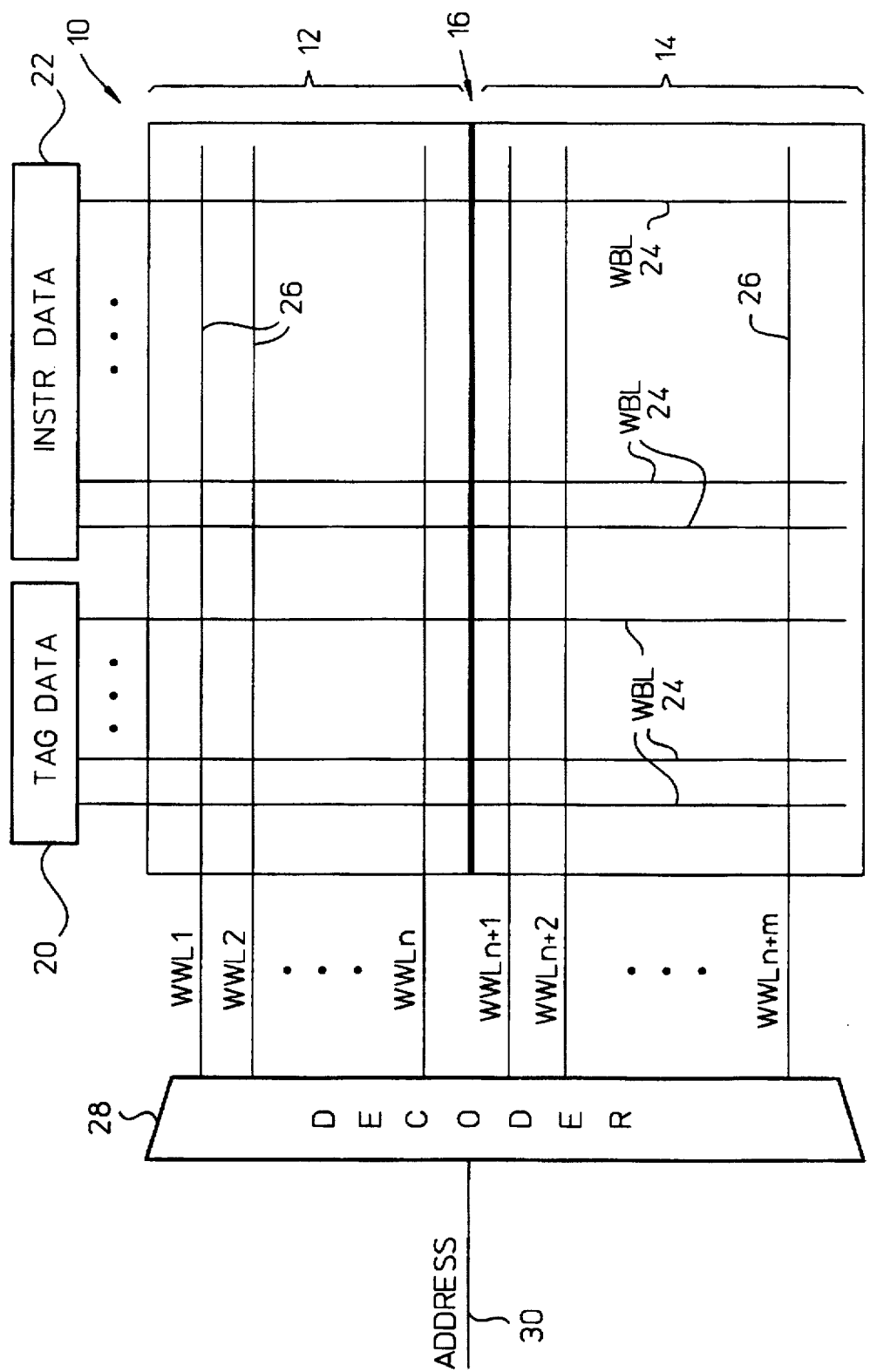
FIG. 2 is a block diagram illustrating the first embodiment of the invention during a write operation.

FIG. 2 is a block diagram illustrating the first embodiment of the invention during a write operation. In general, during a write operation, tag data 20 and instruction data 22 (provided via buffers 4 and 6) are placed on write bit lines (WBL) 24. The cache memory 10 also utilizes write word lines (WWL) 26 during the write operation. A memory cell is present at each intersection of a WBL and a WWL within the cache memory 10. A decoder 28 receives an address 30 which selects one of several write word lines (WWL) 26. The selected WWL is then activated so as to store the tag data 20 and the instruction data 22 into the cache memory 10 at the memory cells associated with the selected WWL.

To implement the invention, the division line 16 operates to partition the cache memory 10 into the first storage region 12 and the second storage region 14. Accordingly, the decoder 28 operates such that it will select one of write word lines WWL1–WWLn as the selected WWL when the instruction to be written to the cache memory 10 is a sequential instruction. This causes the sequential instruction to be stored in the first storage region 12 of the cache memory 10. On the other hand, the decoder 28 will operate to select one of write word lines WWLn+1 to WWLn+m as the selected WWL when the instruction to be written to the cache memory 10 is a branch target instruction.

In this embodiment, the address 30 supplied to the decoder 28 is controlled in a novel manner so that the decoder 28 selects the appropriate write word line (WWL) 26 based on the type of instruction to be stored to the cache memory 10.

Figure 3:
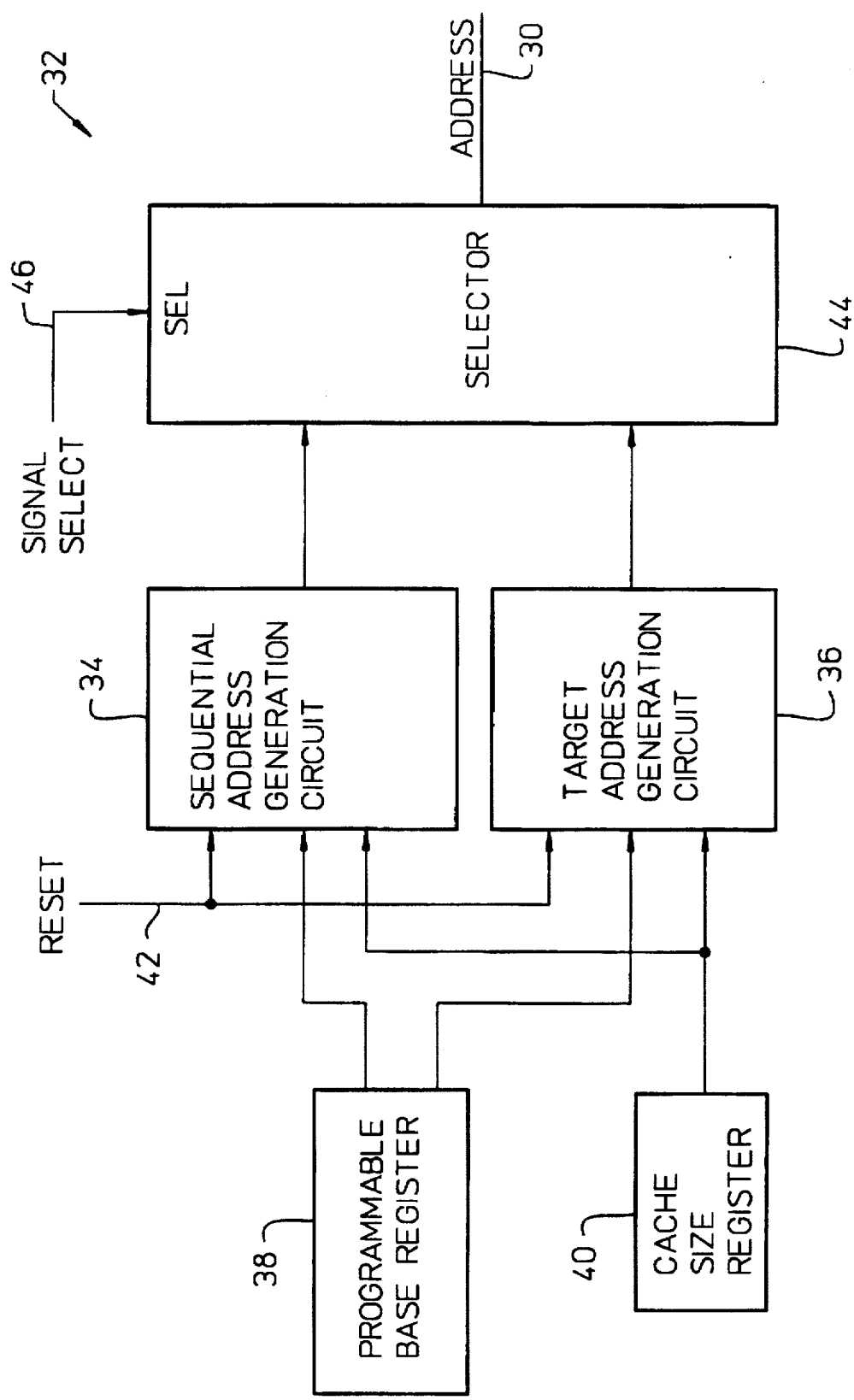
FIG. 3 is a block diagram of an embodiment of an address circuit according to the invention.

FIG. 3 is a block diagram of an embodiment of an address circuit 32 according to the invention. The address circuit 32 includes a sequential address generation circuit 34 which produces a sequential address, and a target address generation circuit 36 which produces a target address. Both the address generation circuits 34, 36 receive a base number from a programmable base register 38, a cache size from a cache size register 40, and a reset signal 42. The base value stored in the programmable base register 38 is a value indicating where the cache memory 10 is to be partitioned. If the cache memory 10 is to be partitioned into more than two regions, then the programmable base register will contain several values which indicate where partitions are to occur. The base value(s) may be stored into the programmable base register 38 at power-on, or alternatively by software techniques. The advantage of the software techniques is that the programmable base register 38 may be changed dynamically. As an example, the programmable base register 38 could be addressable and a special load instruction could be executed to write a base value into the programmable base register 38.

The address circuit 32 also includes a selector 44 which selects one of the sequential address and the target address based on a select signal 46. The select signal 46 can be provided by hardware (not shown) in the instruction unit 2 which can easily determined whether the prefetched instruction is, for example, a sequential instruction or a branch target instruction. For example, upon prefetching an instruction, the instruction unit 2 knows whether it is fetching a sequential instruction or a branch target instruction because some sort of prediction scheme is typically used to decide whether a branch will likely be taken or not. Hence, while prefetching an instruction, a target/sequential bit can be set and thereafter used to produce the select signal 46.

In effect, the base value stored to the programmable base register 38 corresponds to the value n shown in FIG. 2 and the cache size held in the cache size register 40 corresponds to the value n+m shown in FIG. 2. In the embodiment discussed above, where the cache memory 10 is partitioned into only two regions, the write word line WWLn+m would indicate the last word line for the second stored region 14. The value stored in the programmable base register 38 would indicate the value n which is the last write word line (WWLn) in the first storage region 12.

The address generation circuits 34 and 36 can be implemented with digital counters. Further, the techniques utilized to determine the particular write word line to be activated within the region that is storing the data to be written can be determined by numerous known algorithms. One know algorithm is a random replacement algorithm. Using random replacement, the address generation circuits 34 and 36 would simply randomly generate an address within the region in question. Another known algorithm would be to search the region within the cache memory until an available write word line is found. The first write word line determined to be available would then used to store the data to be written. With this approach, the availability of a particular write word line is typically indicated by a extra bit associated with each word stored in the cache memory. This extra bit is preferably set or reset in a background mode of the processing system. In this case, the processing system could search each region within the cache memory until it finds a write word line which is available and then stores the data to be stored next at this location. If no available write word line is found within a predetermined period of time, then a write word line could be arbitrarily selected.

Figure 4:
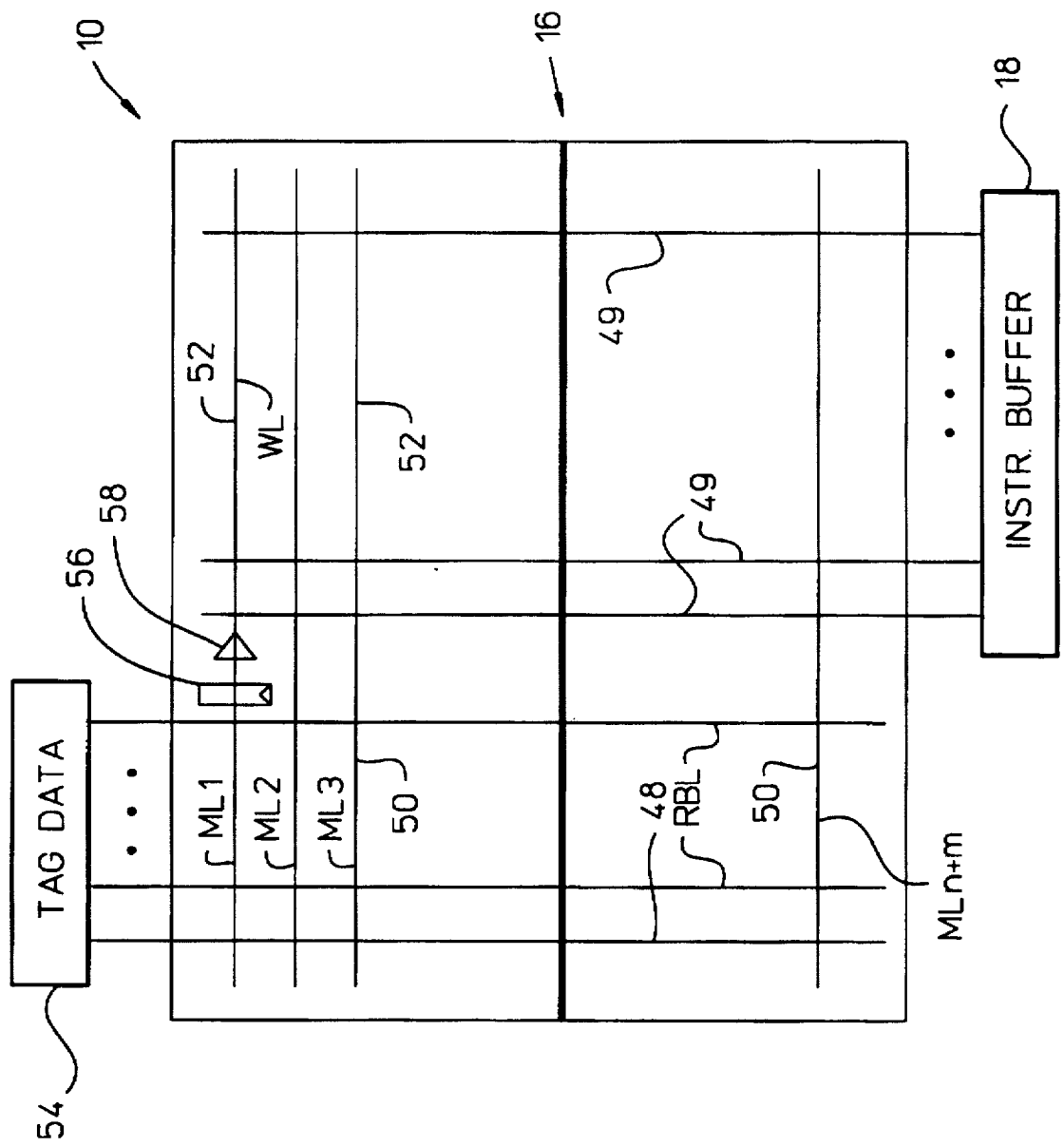
FIG. 4 is a block diagram illustrating the first embodiment of the invention during a read operation.

FIG. 4 is a block diagram of a cache memory during a read operation. The cache memory 10 includes read bit lines (RBL) 48 and 49, match lines 50, and write lines 52. During a read operation, tag data 54 is placed on certain of the read bit lines (RBL) 48. The tag data 54 is then compared with the tag stored at the memory cells associated with each of the match lines (ML) 50. At best, one of the match lines (ML) 50 would be activated upon finding a match between the stored tag and the supplied tag. The activated match line is driven high and latched into latch 56. The latch 56 then in turn separately drives its associated word line (WL) 52 via buffer 58. Although only one latch 56 and buffer 58 are shown in FIG. 4, it should be understood that each match line has a latch 56 and a buffer 58 associated therewith. The particular word line (WL) 52 which is driven causes the data associated with the instruction stored to the memory cells associated with that word line to be placed on the read bit lines 49 which are associated with the stored instructions. The stored instruction is thereby supplied to the instruction buffer 18 over the read bit lines 49.

The processing system executes operations or instructions in accordance with a timing clock (CLK) having a period P. As an example, the period P is currently about four nanoseconds in high performance computers such as workstations. To accommodate such speeds, the comparing of the data tag 54 with the tag stored at the memory cells is preferably achieved by using content-addressable memory (CAM) for the memory cells containing the tag. The memory cells containing the instruction are preferably implemented by a random access memory (RAM). During a first half of the timing clock's cycle, the address evaluation occurs in the CAM, and the RAM storage is precharged. During the second half of the timing clock's cycle, the RAM is read and the CAM is precharged.

Although the embodiments discussed above refer to a cache memory partitioned into two regions, the invention can also be used to partition the cache memory into more than two partitions. For example, a cache memory can be partitioned into three regions, including a sequential instruction region, a branch target instruction region and a victim cache region. In this case, if a level 2 cache miss occurs, then line in the level 2 cache being replaced can be stored in the victim cache. Here, the write bit lines could be used to write back the cache line being replaced to the victim cache. If the sequential instruction region, the branch target instruction region and a victim cache region all use the same tags (e.g., all physical tags or all virtual tags), then all three regions can be referenced simultaneously during a one-cycle read operation. If all the regions do not use the same tags, then two cycles are required. In the first cycle the virtual tag can be compared and address translation performed to obtain a physical tag. If a miss occurs in the first cycle, then in the second cycle, the region(s) using a physical tag are checked for a hit. If a hit occurs in the second cycle, then the cache line is read and possibly moved into another region of the cache to avoid the one-cycle penalty with future accesses to the same cache line.

Dynamic or adaptive application of the invention while executing a software program is advantageous if the software contains loops within the program code. For example, a compiler would identify sections of the program code in which a loop is being carried out, and then indicate in the code an instruction which (when executed) would increase the size of the region in the cache memory allocated to the branch target instructions prior to such loop sections. Then, when the program code leaves the loop sections, the compiler would insert another instruction causing the size of the branch target instruction region within the cache memory to decrease. Such techniques would optimize utilization of the cache memory in accordance with the nature of the program being executed. The programmable base register 38 could be used to dynamically store the partition information.

The invention works well for both direct-mapped and fully-associative caches. Moreover, although the invention was primarily discussed above with reference to instruction cache embodiments, the invention can also be embodied in a data caches where it would be useful to partition different pieces of data for performance reasons. The invention can also be used to partition a cache memory into an instruction cache region and a data cache region.

It may be preferable to also vertically partition the instruction cache as described in U.S. patent application Ser. No. 08/299,174, entitled "Vertically Partitioned Instruction Cache," and filed concurrently herewith, which is hereby incorporated by reference. For example, the instruction cache 10 could be vertically partitioned to avoid the need for an additional stage in a pipeline to determine a next instruction address.

The many features and advantages of the invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A cache memory, comprising:
a single memory array having word lines, write bit lines, and read bit lines;
an address circuit coupled to the words lines of the memory, wherein the address circuit partitions the memory array into a sequentially addressed storage region and a randomly addressed storage region during a write operation, wherein each of the sequentially addressed storage region and the randomly addressed storage region is a physically integral storage region and includes a plurality of physically contiguous storage locations, wherein the address circuit further comprises
a sequential address generation circuit that produces a sequential address for addressing the sequentially addressed storage region;
a random address generation circuit that produces a random address for addressing the randomly addressed storage region;
a selector coupled to the sequential address generation circuit and the random address generation circuit to select one of the sequential address and the random address to be applied to the memory array during the write operation;
a programmable register that stores a base value that indicates where the memory array is partitioned, wherein the programmable register is coupled to the sequential address generation circuit and the random address generation circuit; and wherein the programmable register is re-programmable to change the base value such that the memory army is dynamically partitioned.

2. The cache memory of claim 1, further comprising a decoder coupled to the word lines of the memory array and the selector of the address circuit.

3. A method of managing a cache memory having a single memory array and an address circuit having a first address generation circuit that produces an address for addressing a first storage region and a second address generation circuit that produces an address for addressing a second storage region, said method comprising the steps of:

(A) partitioning by said address circuit, the single memory array into a first physically integral storage region and a second physically integral storage region, wherein the first storage region includes a plurality of physically contiguous storage locations to store a plurality of non-branch instructions and the second storage region includes a plurality of physically contiguous storage locations to store a plurality of branch instructions; and (B) storing an instruction into said single array cache memory, said storing step comprises (i) determining whether the instruction is a branch instruction;

(ii) if the instruction is not a branch instruction, then storing the instruction in the first storage region;

(iii) if the instruction is a branch instruction, then storing the instruction in the second storage region.

* * * * *